(12) United States Patent
Niki et al.

(10) Patent No.: US 10,308,318 B2
(45) Date of Patent: Jun. 4, 2019

(54) BICYCLE DERAILLEUR

(71) Applicant: Shimano Inc., Sakai, Osaka (JP)

(72) Inventors: Kazutaka Niki, Osaka (JP); Takeshi Fujiwara, Osaka (JP)

(73) Assignee: Shimano Inc., Osaka (JP)

( * ) Notice: Subject to any disclaimer, the term of this patent is extended or adjusted under 35 U.S.C. 154(b) by 101 days.

(21) Appl. No.: 15/602,434

(22) Filed: May 23, 2017

(65) Prior Publication Data

US 2018/0339747 A1 Nov. 29, 2018

(51) Int. Cl.
*B62J 99/00* (2009.01)
*B62M 9/132* (2010.01)
*B62M 9/134* (2010.01)

(52) U.S. Cl.
CPC ........... *B62M 9/132* (2013.01); *B62M 9/134* (2013.01); *B62J 2099/002* (2013.01); *B62K 2208/00* (2013.01)

(58) Field of Classification Search
CPC .......... B62M 9/14; B62M 9/12; B62M 25/08; B62M 9/134; B62K 23/06
USPC ......................................................... 474/80
See application file for complete search history.

(56) References Cited

U.S. PATENT DOCUMENTS

| | | | | |
|---|---|---|---|---|
| 4,127,038 A * | 11/1978 | Browning | ................ | B62M 9/10 280/236 |
| 4,580,997 A * | 4/1986 | Browning | ................ | B62M 9/14 474/160 |
| 4,592,738 A * | 6/1986 | Nagano | .................... | B62M 9/14 474/162 |
| 5,073,152 A * | 12/1991 | Browning | .............. | B62M 9/125 474/162 |
| 5,205,794 A * | 4/1993 | Browning | ................ | B62M 9/14 474/160 |
| 5,354,243 A * | 10/1994 | Kriek | ........................ | B62M 9/14 474/135 |
| 5,649,877 A * | 7/1997 | Patterson | ................ | B62M 9/134 474/80 |
| 6,173,982 B1 * | 1/2001 | Westergard | ............ | B62M 9/085 280/261 |
| 6,443,032 B1 * | 9/2002 | Fujii | ........................ | B62M 9/04 474/82 |
| 8,998,756 B2 * | 4/2015 | Ichida | .................... | B62K 23/06 474/70 |
| 9,221,518 B2 * | 12/2015 | Tzvetkov | ................ | B62M 9/134 |
| 9,499,233 B2 * | 11/2016 | Schuster | .................. | B62M 9/08 |
| 9,725,132 B2 * | 8/2017 | Hara | ........................ | B62M 1/36 |
| 10,099,746 B2 * | 10/2018 | Briers | ...................... | B62M 9/14 |
| 2005/0227798 A1 * | 10/2005 | Ichida | .................... | B62K 23/06 474/81 |
| 2013/0225340 A1 * | 8/2013 | Tzvetkov | ................. | B62M 9/12 474/80 |
| 2014/0265219 A1 * | 9/2014 | Scolari | ..................... | B62M 9/12 280/261 |
| 2016/0347405 A1 * | 12/2016 | Tetsuka | .................... | B62M 3/00 |

* cited by examiner

*Primary Examiner* — Henry Y Liu
(74) *Attorney, Agent, or Firm* — Global IP Counselors, LLP (57) ABSTRACT

A bicycle derailleur is basically provided with a base member, a movable member and an electric actuator. The base member is configured to rotate together with a bicycle sprocket apparatus about a rotational axis of the bicycle sprocket apparatus. The movable member is movable relative to the base member to displace a bicycle chain. The electric actuator is configured to electrically actuate the movable member.

23 Claims, 11 Drawing Sheets

BICYCLE DERAILLEUR

BACKGROUND

Field of the Invention

This invention generally relates to a bicycle derailleur. More specifically, the present invention relates to a bicycle derailleur that displaces a chain between a pair of bicycle sprockets using an electric actuator.

Background Information

Many bicycles are provided with a drivetrain that allows the rider to changing a gear ratio for transferring power from the pedals to the rear wheel. Often the drivetrain uses one or more derailleurs to change the gear ratio. A front derailleur is mounted to the bicycle frame adjacent to front sprockets to shift a chain laterally between the front sprockets, while a rear derailleur is mounted adjacent to a hub of the rear wheel to shift the chain laterally between rear sprockets. Recently, some bicycles have been provided with a derailleur that is moved by an electric actuator to make riding easier for the rider. Typically, a rider operates a shifter to actuate the electric actuator of the derailleur to perform a shifting operation.

SUMMARY

Generally, the present disclosure is directed to various features of a bicycle derailleur having electric actuator to perform a shifting operation.

In view of the state of the known technology and in accordance with a first aspect of the present disclosure, a bicycle derailleur is provided that basically comprises a base member, a movable member and an electric actuator. The base member is configured to rotate together with a bicycle sprocket apparatus about a rotational axis of the bicycle sprocket apparatus. The movable member is movable relative to the base member to displace a bicycle chain. The electric actuator is configured to electrically actuate the movable member.

According to the first aspect of the present invention, it is possible to shift a bicycle chain between a plurality of front sprockets by using pedaling force of a rider. Therefore, it is possible to reduce an electricity to actuate an electric actuator.

In accordance with a second aspect of the present invention, the bicycle derailleur according to the first aspect is configured so that the base member is configured to be mounted to the bicycle sprocket apparatus.

According to the second aspect of the present invention, it is possible to shift a bicycle chain between a plurality of front sprockets by using pedaling force of a rider. Therefore, it is possible to reduce an electricity to actuate an electric actuator.

In accordance with a third aspect of the present invention, the bicycle derailleur according to the second aspect is configured so that the base member is configured to be mounted to a sprocket body of the bicycle sprocket apparatus.

According to the third aspect of the present invention, it is easy to detach and/or attach a base member from and/or to a bicycle crank assembly.

In accordance with a fourth aspect of the present invention, the bicycle derailleur according to any one of the first to third aspects is configured so that the movable member protrudes from the base member in a radially outward direction with respect to the rotational axis in a mounted state where the bicycle derailleur is mounted to the bicycle sprocket apparatus.

According to the fourth aspect of the present invention, it is possible to shift a bicycle chain between a plurality of front sprockets by using pedaling force of a rider. Therefore, it is possible to reduce an electricity to actuate an electric actuator.

In accordance with a fifth aspect of the present invention, the bicycle derailleur according to the fourth aspect is configured so that the movable member is configured to be disposed radially outward from sprocket teeth of the bicycle sprocket apparatus in the mounted state.

According to the fifth aspect of the present invention, it is possible to shift a bicycle chain between a plurality of front sprockets by using pedaling force of a rider. Therefore, it is possible to reduce an electricity to actuate an electric actuator.

In accordance with a sixth aspect of the present invention, the bicycle derailleur according to any one of the first to fifth aspects is configured so that the movable member is pivotally arranged about a pivot axis with respect to the base member.

According to the sixth aspect of the present invention, it is possible to achieve simple movement mechanism of a movable member.

In accordance with a seventh aspect of the present invention, the bicycle derailleur according to the sixth aspect is configured so that the pivot axis is perpendicular to the rotational axis.

According to the seventh aspect of the present invention, it is possible to achieve simple movement mechanism of a movable member.

In accordance with an eighth aspect of the present invention, the bicycle derailleur according to the seventh aspect is configured so that the pivot axis extends in a tangential direction with respect to a circle centered on the rotational axis in a mounted state where the bicycle derailleur is mounted to the bicycle sprocket apparatus.

According to the eighth aspect of the present invention, it is possible to achieve simple movement mechanism of a movable member.

In accordance with a ninth aspect of the present invention, the bicycle derailleur according to any one of the first to eighth aspects is configured so that the movable member is movably arranged between a first position and a second position in an axial direction that is parallel to the rotational axis in a mounted state where the bicycle derailleur is mounted to the bicycle sprocket apparatus. The first position is different from the second position.

According to the ninth aspect of the present invention, it is possible to achieve upshifting and downshifting by movement of a movable member between at least two positions. Thus, the controller does not need a complex control of the movable member.

In accordance with a tenth aspect of the present invention, the bicycle derailleur according to the ninth aspect is configured so that the first position corresponding to an upshifting operation and a second position corresponding to a downshifting operation.

According to the tenth aspect of the present invention, it is possible to achieve upshifting and downshifting by movement of a movable member between at least two positions. Thus, the controller does not need a complex control of the movable member.

In accordance with an eleventh aspect of the present invention, the bicycle derailleur according to the ninth or tenth aspect is configured so that further comprises a controller configured to control the electric actuator to selectively move the movable member toward one of the first position and the second position in accordance with an input signal.

According to the eleventh aspect of the present invention, it is possible to achieve upshifting and downshifting by movement of a movable member between at least two positions. Thus, the controller does not need a complex control of the movable member.

In accordance with a twelfth aspect of the present invention, the bicycle derailleur according to the eleventh aspect is configured so that the controller is configured to control the electric actuator to move the movable member toward the one of the first position and the second position only within a predetermined rotational angle of the bicycle sprocket apparatus about the rotational axis.

According to the twelfth aspect of the present invention, it is possible to avoid miss-shifting causing a chain dropping.

In accordance with a thirteenth twelfth aspect of the present invention, the bicycle derailleur according to the eleventh or aspect is configured so that the controller is configured to control the electric actuator to maintain the movable member in the one of the first position and the second position.

According to the thirteenth aspect of the present invention, it is possible to minimize power consumption.

In accordance with a fourteenth aspect of the present invention, the bicycle derailleur according to any one of the eleventh to thirteenth aspects is configured so that the controller is configured to maintain the movable member in the one of the first position and the second position until the controller receives the input signal to move the movable member toward the other of the first position and the second position.

According to the fourteenth aspect of the present invention, it is possible to save a consumption of electricity to move a movable member.

In accordance with a fifteenth aspect of the present invention, the bicycle derailleur according to any one of the eleventh to fourteenth aspects further comprises a wireless receiver to receive the input signal for the controller to control movement of the movable member.

According to the fifteenth aspect of the present invention, it is possible to omit an electric cable to connect a bicycle derailleur to a switch to output an input signal.

In accordance with a sixteenth aspect of the present invention, the bicycle derailleur according to any one of the ninth to fifteenth aspects is configured so that the bicycle sprocket apparatus includes a first sprocket and a second sprocket. The first sprocket has a first sprocket body and a plurality of first sprocket teeth extending radially outward from the first sprocket body. The second sprocket has a second sprocket body and a plurality of second sprocket teeth extending radially outward from the second sprocket body. A diameter of the second sprocket body is larger than a diameter of the first sprocket body. The first position is closer to a first rotational plane defined by first sprocket teeth of the first sprocket than the second position with respect to the axial direction in the mounted state.

According to the sixteenth aspect of the present invention, it is possible to achieve upshifting and downshifting by movement of a movable member between at least two positions. Thus, the controller does not need a complex control of the movable member.

In accordance with a seventeenth aspect of the present invention, the bicycle derailleur according to the sixteenth aspect is configured so that the movable member intersects with the first rotational plane in the first position.

According to the seventeenth aspect of the present invention, it is possible to certainly engage a movable member with a bicycle chain engaged with a first sprocket In accordance with an eighteenth aspect of the present invention, the bicycle derailleur according to the sixteenth or seventeenth aspect is configured so that the second position is closer to a second rotational plane defined by a second sprocket teeth of a second sprocket than the first position with respect to the axial direction in the mounted state.

According to the eighteenth aspect of the present invention, it is possible to achieve upshifting and downshifting by movement of a movable member between at least two positions. Thus, the controller does not need a complex control of the movable member.

In accordance with a nineteenth aspect of the present invention, the bicycle derailleur according to the eighteenth aspect is configured so that the movable member intersects with the second rotational plane in the second position.

According to the nineteenth aspect of the present invention, it is possible to certainly engage a movable member with a bicycle chain engaged with a second sprocket.

In accordance with a twentieth aspect of the present invention, the bicycle derailleur according to any one of the first to nineteenth aspects is configured so that the electric actuator is positioned radially inward of the movable member with respect to the rotational axis in a mounted state where the bicycle derailleur mounted to the bicycle sprocket apparatus.

According to the twentieth aspect of the present invention, it is possible to effectively arrange a movable member and an electric actuator.

In accordance with a twenty-first aspect of the present invention, the bicycle derailleur according to the twentieth aspect is configured so that the bicycle sprocket apparatus includes a bicycle crank assembly including a first sprocket, a second sprocket, a crank arm and a crank axle. The electric actuator is disposed on one of the crank arm and the crank axle.

According to the twenty-first aspect of the present invention, it is possible to effectively arrange a movable member and an electric actuator.

In accordance with a twenty-second aspect of the present invention, the bicycle derailleur according to any one of the first to twenty-first aspects further comprises a transmitting member to transmit a driving force from the electric actuator to the movable member.

According to the twenty-second aspect of the present invention, it is possible to locate an electric actuator distant from a movable member.

In accordance with a twenty-third aspect of the present invention, the bicycle derailleur according to the twenty-second aspect is configured so that the transmitting member includes a flexible member.

According to the twenty-third aspect of the present invention, it is possible to minimize a space to arrange a transmitting member.

In accordance with a twenty-fourth aspect of the present invention, the bicycle derailleur according to any one of the first to twenty-fourth aspects further comprises a power supply to supply electricity to the electric actuator.

According to the twenty-fourth aspect of the present invention, it is possible to shift a bicycle chain between a plurality of front sprockets by using pedaling force of a rider. Therefore, it is possible to reduce an electricity to actuate an electric actuator.

In accordance with a twenty-fifth aspect of the present invention, the bicycle derailleur according to the twenty-fourth aspect is configured so that the bicycle sprocket apparatus includes a bicycle crank assembly including a first sprocket, a second sprocket, a crank arm and a crank axle, and the power supply is configured to be disposed into the crank axle.

According to the twenty-fifth aspect of the present invention, it is possible to effectively arrange a power supply on a bicycle crank assembly.

Also, other objects, features, aspects and advantages of the disclosed bicycle derailleur will become apparent to those skilled in the art from the following detailed description, which, taken in conjunction with the annexed drawings, discloses one embodiment of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
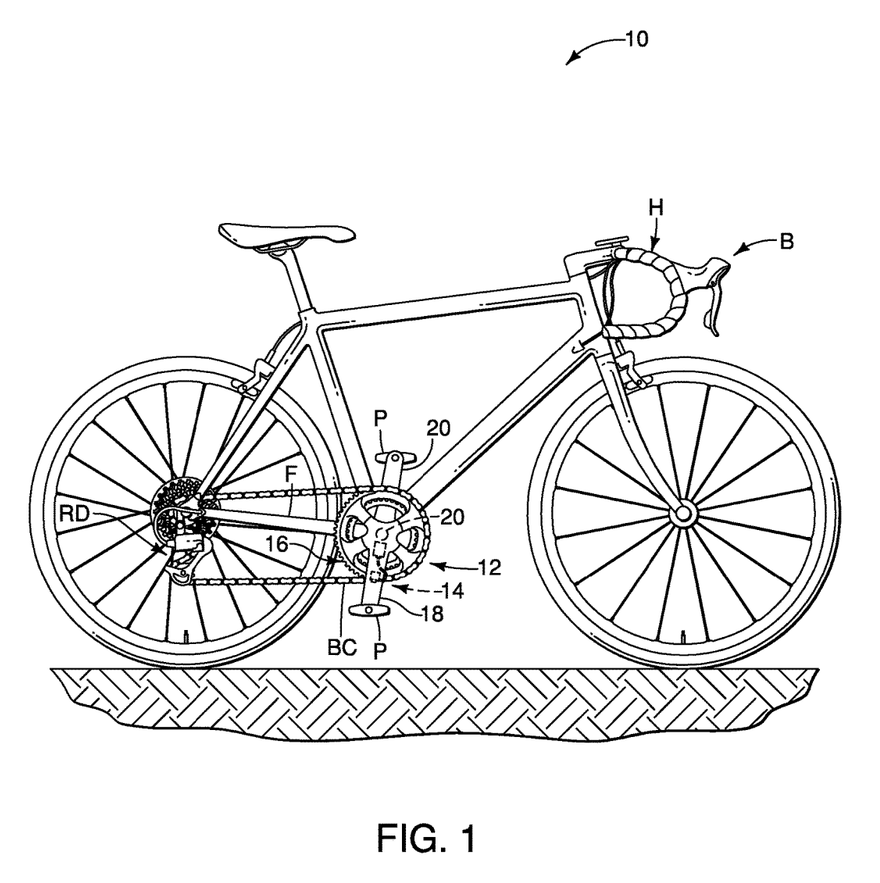
FIG. 1 is a side elevational view of a bicycle that is equipped with a bicycle sprocket apparatus having a bicycle derailleur in accordance with one illustrated embodiment.

Referring initially to FIG. 1, a bicycle 10 is illustrated that is equipped with a bicycle sprocket apparatus 12 having a bicycle derailleur 14 in accordance with one illustrated embodiment. The bicycle sprocket apparatus 12 includes a bicycle crank assembly 16 that supports the bicycle derailleur 14 as explained below. The bicycle crank assembly 16 is rotatably mounted to a bicycle frame F in a conventional manner. As seen in FIG. 1, the bicycle 10 is illustrated as a road style bicycle having an electrically-controlled drive train. Of course, it will be apparent to those skilled in the bicycle field from this disclosure that the bicycle crank assembly 16 and/or the bicycle derailleur 14 can be implemented with other types of bicycles as needed and/or desired. Here, the bicycle 10 has a drop handlebar H with a pair of road brifters B (i.e., a bicycle operating device that combines a shifter and a brake operating device). One of the road brifters B is used to control the bicycle derailleur 14, which is a front derailleur, and a front brake device, while the other one of the road brifters B is used to control a rear derailleur RD.

Figure 2:
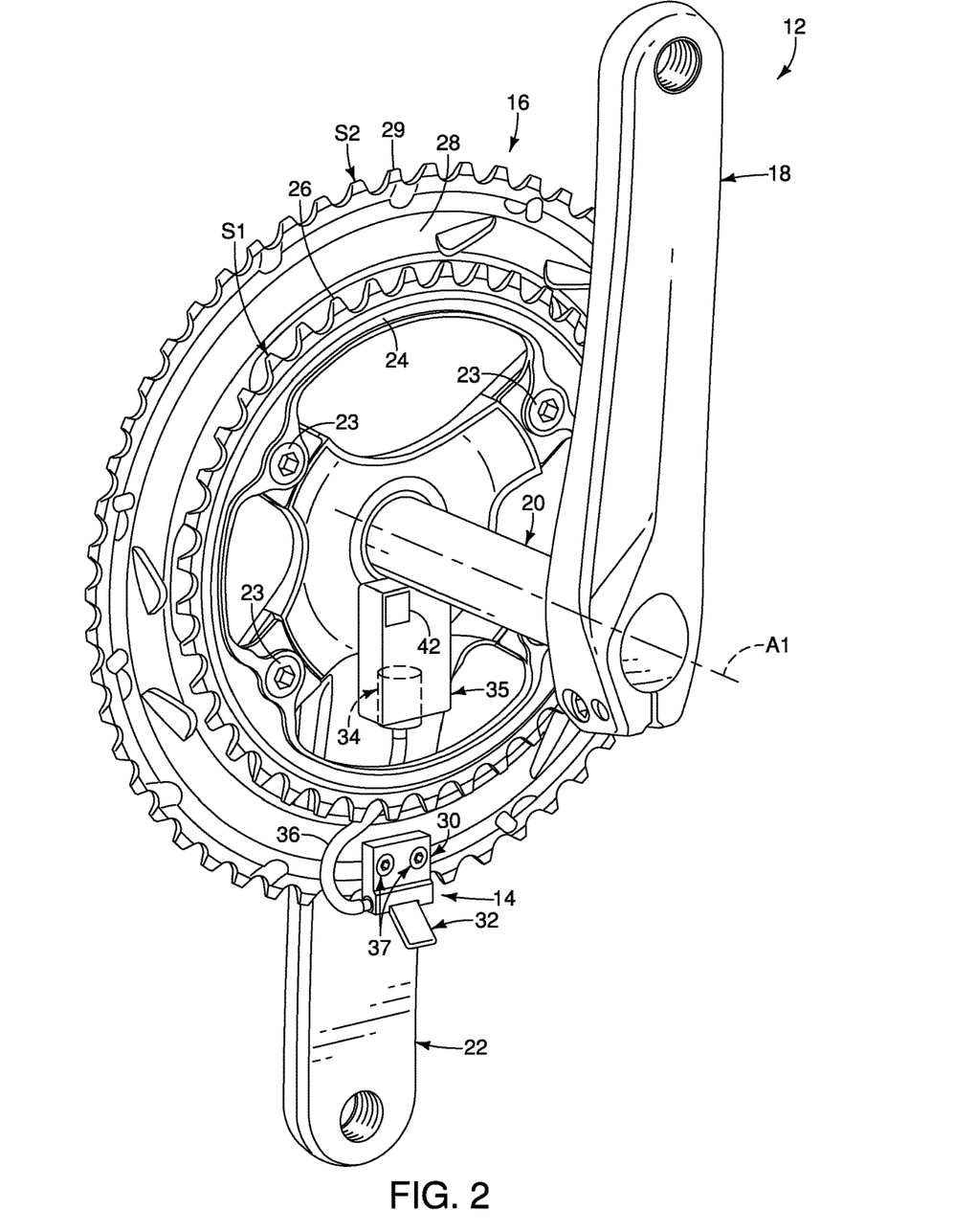
FIG. 2 is a perspective view of a bicycle crank assembly of the bicycle sprocket apparatus that includes the bicycle derailleur in accordance with the illustrated embodiment.

As seen in FIG. 2, the bicycle crank assembly 16 includes a first sprocket S1, a second sprocket S2, a crank arm 18 and a crank axle 20. In other words, the bicycle sprocket apparatus 12 includes the first sprocket S1 and the second sprocket S2. Preferably, the bicycle crank assembly 16 further includes a crank arm 22. Here, the crank arm 18 is a first or right crank arm, while the crank arm 22 is a second or left crank arm. Thus, hereinafter, the crank arm 18 will be referred to the first crank arm 18, while the crank arm 22 will be referred to the second crank arm 22. The first crank arm 18 is rigidly fixed to a first (right) end of the crank axle 20 in a conventional manner (e.g., crimping, locking ring, adhesive, etc.). The second crank arm 22 is fixed to a second (left) end of the crank axle 20 in a releasable and reinstallable manner (e.g., clamping or other suitable arrangement). The crank axle 20 defines a rotational axis A1 of the bicycle sprocket apparatus 12. The first and second crank arms 18 and 22 extend radially outward from the rotational axis A1 such that the first and second crank arms 18 and 22 are 180° out of phase with each other. The first and second sprockets S1 and S2 are fixed to the first crank arm 18 by, for example, four fixing bolts 23. The first and second sprockets S1 and S2 are arranged parallel to each other and perpendicular to the rotational axis A1.

As seen in FIG. 1, a bicycle pedal P is rotatably attached to each of the first and second crank arms 18 and 22. When a rider applies a force on the bicycle pedals P during riding, a pedaling force or a pedaling torque is transmitted to the first and second crank arms 18 and 22. The first and second crank arms 18 and 22 rotate the first and second sprockets S1 and S2 to move a bicycle chain BC and propel the bicycle 10 in a conventional manner.

The first crank arm 18 is illustrated as being formed with a two-piece construction. Likewise, the second crank arm 22 is illustrated as being formed with a two-piece construction. In particular, each of the first and second crank arms 18 and 22 includes a cover member that is fixedly attached (i.e., bonded) to a body member that is a one-piece, unitary part. As a result, a crank portion of each of the first and second crank arms 18 and 22 has an interior space to reduce the weight of the first and second crank arms 18 and 22. This interior space can be empty or filled with a resin material as needed and/or desired. However, the first and second crank arms 18 and 22 are not limited to this construction. The first and second crank arms 18 and 22 can each be formed of a single piece or of several pieces of various materials.

Figure 3:
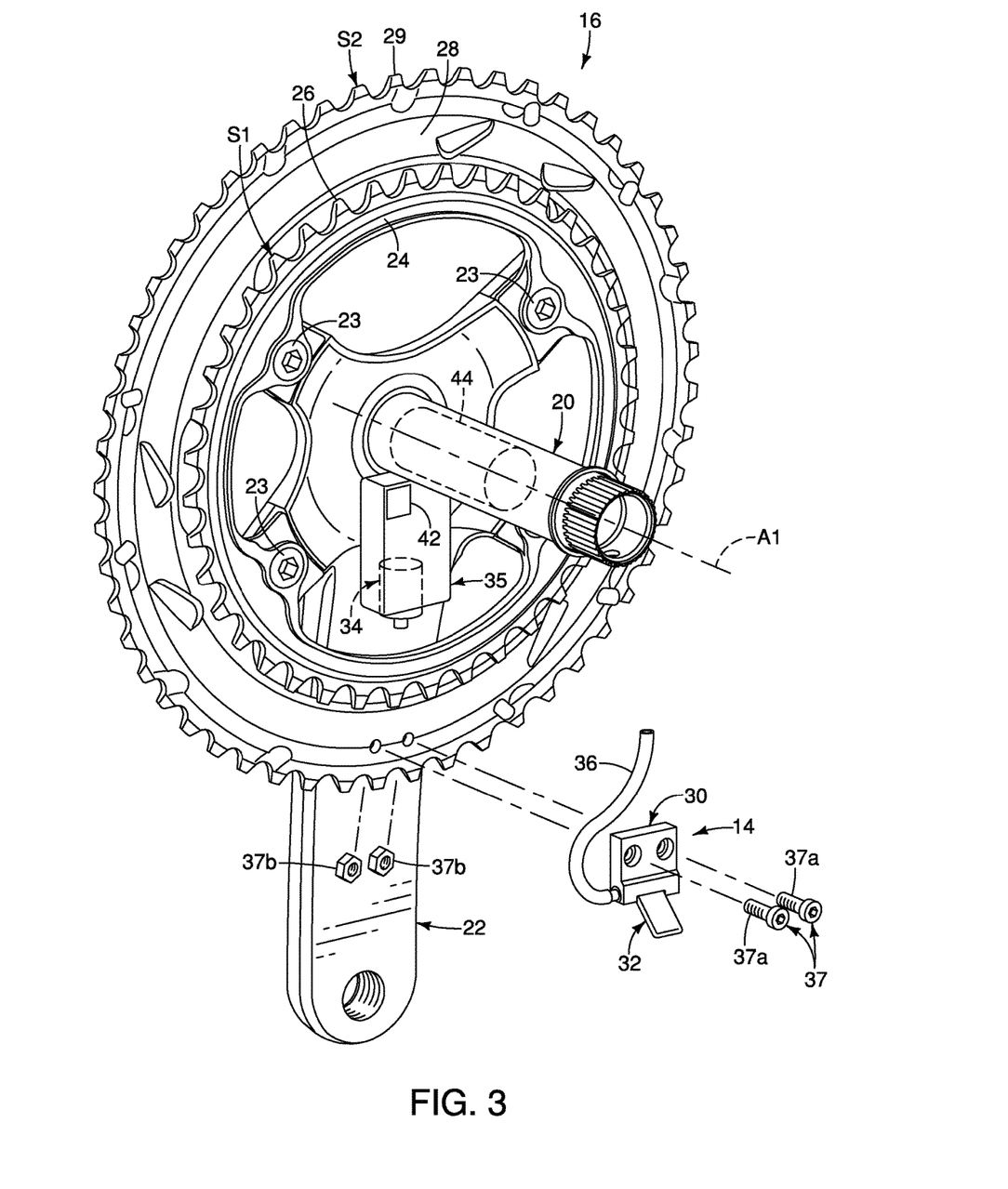
FIG. 3 is a perspective view of the bicycle crank assembly illustrated in FIG. 2, but with the left crank arm removed and the bicycle derailleur detached from the bicycle crank assembly.
Figure 4:
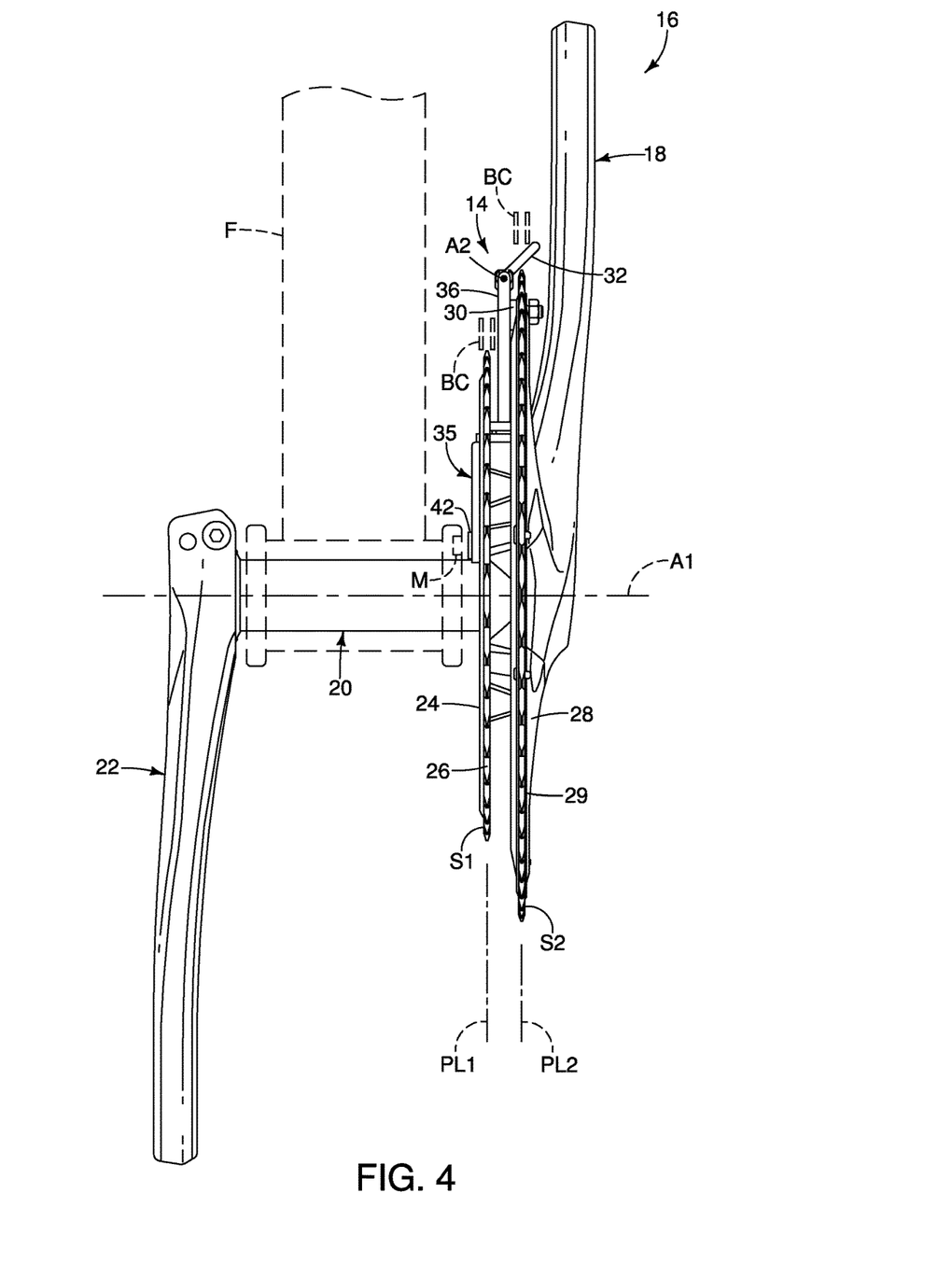
FIG. 4 is a rear end elevational view of the bicycle crank assembly with the bicycle derailleur attached thereto and a portion of a bicycle frame shown in broken lines.

As seen in FIG. 3, the crank axle 20 is a hollow pipe-shaped member that is made of a rigid material. For example, the crank axle 20 is made of a metallic material as chrome molybdenum steel. As seen in FIG. 2, the first and second crank arms 18 and 22 are fixed to opposite end portions of the crank axle 20 and extend in opposite directions. Here, each end portion of the crank axle 20 has a plurality of external splines or serrations for preventing rotation of the first and second crank arms 18 and 22 with respect to the crank axle 20. Thus, the crank axle 20 and the first and second crank arms 18 and 22 rotate together as an integrated unit. As seen in FIG. 4, the crank axle 20 is rotatably supported by a bottom bracket BB in a hanger tube of the frame F for rotation about the rotational axis A1. The bottom bracket BB is a conventional structure, except that the bottom bracket BB is provided with a pair of magnets M. The magnets M are fixed to the right side of the bottom bracket BB. The magnets M are angularly spaced apart about the rotational axis A1 for aiding in determining a crank angle positon of the first crank arm 18 as will be discussed later.

As seen in FIGS. 2 to 4, the first sprocket S1 has a first sprocket body 24 and a plurality of first sprocket teeth 26. The first sprocket teeth 26 extend radially outward from the first sprocket body 26. The first sprocket teeth 26 define a first rotational plane PL1 that is perpendicular to the rotational axis A1. The first sprocket S1 is a one-piece, unitary member that is preferably formed of a suitable metallic material such as a stainless steel, an aluminum alloy, a magnesium alloy, a titanium alloy, etc. The second sprocket S2 has a second sprocket body 28 and a plurality of second sprocket teeth 29. The second sprocket teeth 29 extend radially outward from the second sprocket body 28. The second sprocket teeth 29 define a second rotational plane PL2 that is perpendicular to the rotational axis A1. The second sprocket teeth 29 are formed as a one-piece, unitary member that is preferably formed of a suitable metallic material such as a stainless steel, an aluminum alloy, a magnesium alloy, a titanium alloy, etc. The second sprocket body 28 is formed as a non-metallic material that is mold onto the second sprocket teeth 29. A diameter of the second sprocket body 29 is larger than a diameter of the first sprocket body 24.

As seen in FIGS. 2 to 4, the bicycle derailleur 14 basically comprises a base member 30, a movable member 32 and an electric actuator 34. The base member 30 is configured to rotate together with the bicycle sprocket apparatus 12 about the rotational axis A1 of the bicycle sprocket apparatus 12. The movable member 32 is movable relative to the base member 30 to displace the bicycle chain BC. The electric actuator 34 is configured to electrically actuate the movable member 32. Here, the electric actuator 34 is disposed in a housing 35 that is mounted to the first crank arm 18. The bicycle derailleur 14 further comprises a transmitting member 36 to transmit a driving force from the electric actuator 34 to the movable member 32. Here, the transmitting member 36 includes a flexible member that has one end fixedly coupled to the electric actuator 34 and the other end fixedly coupled to the movable member 32. Basically, the electric actuator 34 rotates the transmitting member 36 to move the movable member 32 as discussed below. When a rider applies a force on the bicycle pedals P during riding, a pedaling force or a pedaling torque is transmitted to the first and second crank arms 18 and 22. The first and second crank arms 18 and 22 rotate the first and second sprockets S1 and S2 to move a bicycle chain BC and propel the bicycle 10 in a conventional manner.

As explained below, the movable member 32 is mounted to the bicycle sprocket apparatus 12 such that the movable member 32 rotates about the rotational axis A1 of the bicycle sprocket apparatus 12. Accordingly, as the movable member 32 rotates about the rotational axis A1 and after the movable member 32 has moved from a non-shifting position to a shifting position, the movable member 32 then subsequently engages the bicycle chain BC to lift the bicycle chain BC off the current one of the first and second sprockets S1 and S2. Also, as the movable member 32 lifts the bicycle chain BC off the current one of the first and second sprockets S1 and S2 as a result of the pedaling force of the rider, the movable member 32 is arranged to guide the bicycle chain BC from the current one of the first and second sprockets S1 and S2 to the other of first and second sprockets S1 and. S2. In other words, the electric actuator 34 moves the movable member 32 from a non-shifting position to a shifting position when the movable member 32 will not engage the bicycle chain BC. In this way, the electric actuator 34 can move the movable member 32 without applying a force against a chain resistance to derail the bicycle chain BC. In other words, the force to movement the movable member 32 from a non-shifting position to a shifting position is very small since the electric actuator 34 does not need to apply a force to derail the bicycle chain BC from the current one of the first and second sprockets S1 and S2. Rather, the pedaling force is used to lift the bicycle chain BC off the current one of the first and second sprockets S1 and S2 and guide the bicycle chain BC from the current one of the first and second sprockets S1 and S2 to the other of first and second sprockets S1 and S2. In other words, the derailing force to shift the bicycle chain BC from the current one of the first and second sprockets S1 and S2 to the other of first and second sprockets S1 and S2 is accomplished solely by the pedaling force of the rider. In this way, the amount of electrical energy used by the electric actuator 34 can be minimized.

Figure 6:
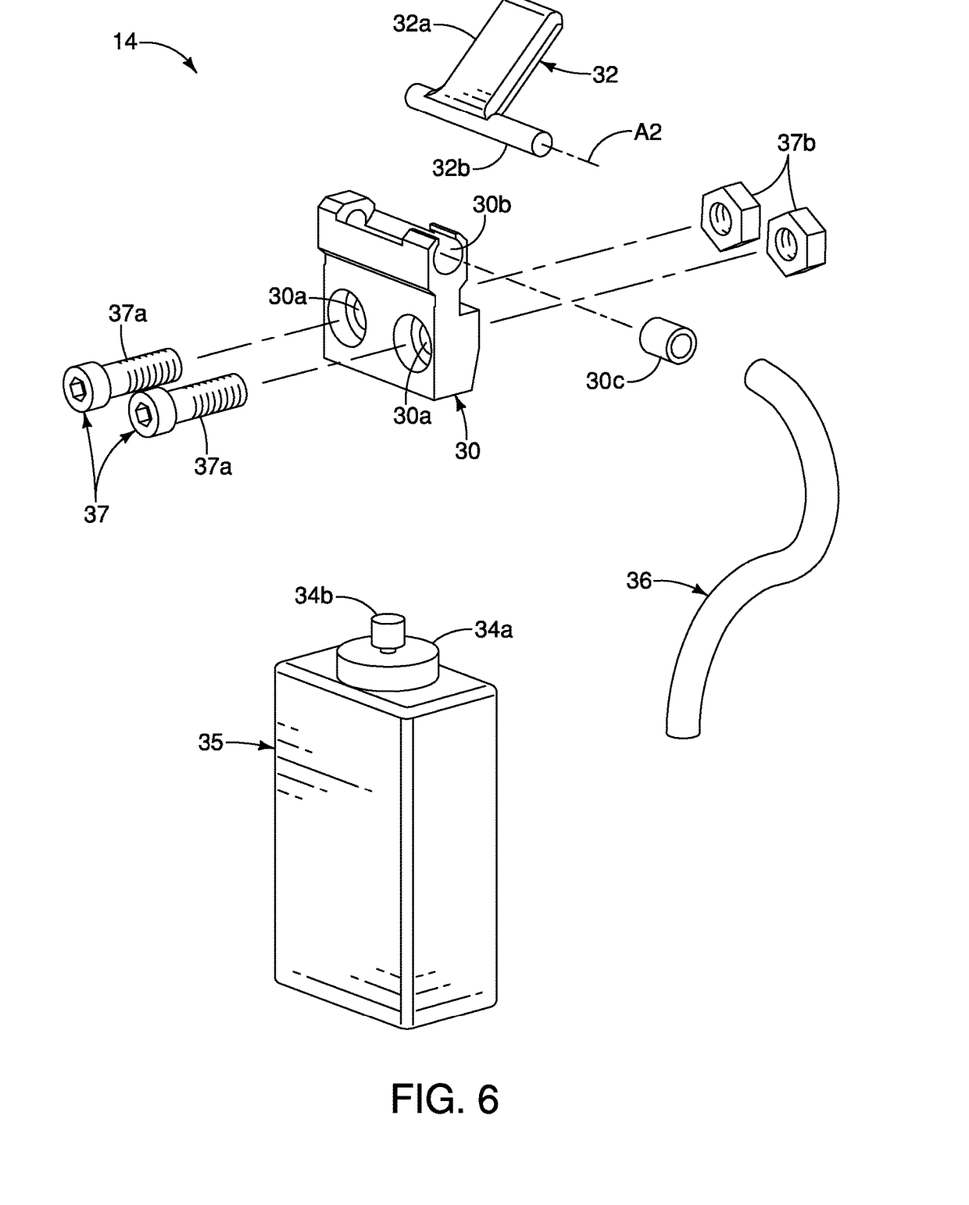
FIG. 6 is an exploded perspective view of selected parts of the bicycle derailleur.

Referring now to FIG. 6, the base member 30 is a rigid member made of a suitable rigid material such as a rigid non-metallic material or a metallic material. The base member 30 is configured to be mounted to the bicycle sprocket apparatus 12. Specifically, the base member 30 is configured to be mounted to the second sprocket body 28 of the second sprocket S2 of the bicycle sprocket apparatus 12. Here, the base member 30 is detachably attached to the second sprocket body 28 of the second sprocket S2 by a pair of fasteners 37. For example, in the illustrated embodiment, each of the fasteners 37 includes a bolt 37a and a nut 37b. The base member 30 includes a pair of through hole 30a for receiving the bolt 37a therethrough. In this way, the base member 30 can be attached to the second sprocket body 28, and then subsequently the base member 30 can be detached and reattached to the second sprocket body 28 using the fasteners 37. The base member 30 further includes an attachment socket 30b and a bushing 30c for pivotally supporting the movable member 32 on the base member 30.

The movable member 32 is a rigid one-piece member made of a suitable rigid material such as a rigid non-metallic material or a metallic material. The movable member 32 protrudes from the base member 30 in a radially outward direction with respect to the rotational axis A1 in a mounted state where the bicycle derailleur 14 is mounted to the bicycle sprocket apparatus 12. Specifically, the movable member 32 has a paddle portion 32a and a mounting portion 32b. The mounting portion 32b has a cylindrical protrusion that is pivotally disposed in the attachment socket 30b of the base member 30a. The bushing 30c disposed on one end of the mounting portion 32b and disposed in the attachment socket 30b to pivotally retain the movable member 32 on the base member 30. The paddle portion 32a extends radially outward from the mounting portion 32b. The paddle portion 32a is configured to contact the bicycle chain BC when actuated. In this way, as shown in FIG. 4, the movable member 32 is configured to be disposed radially outward from the second sprocket teeth 29 of the second sprocket S2 of the bicycle sprocket apparatus 12 in the mounted state.

Figure 10:
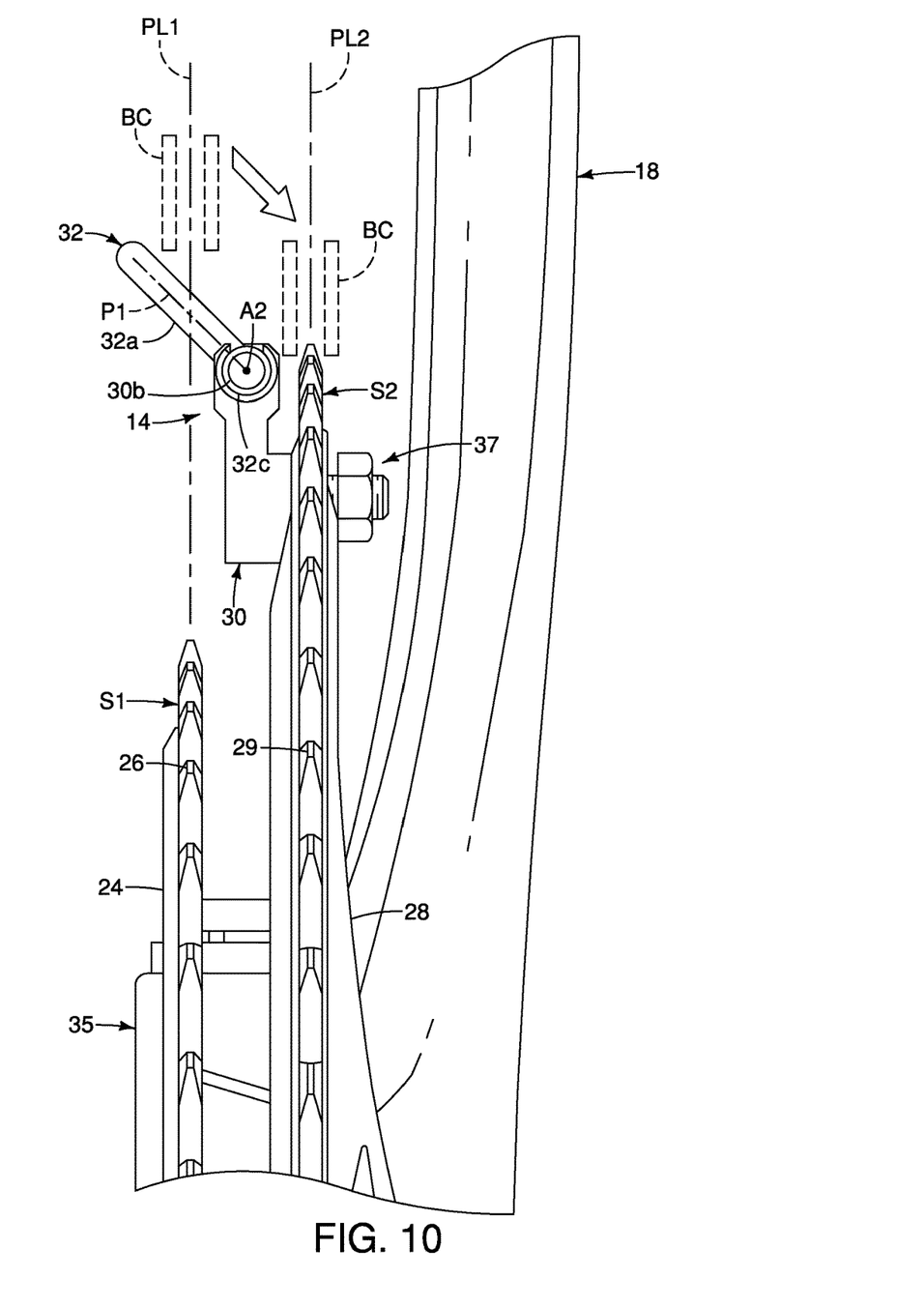
FIG. 10 is a partial rear end elevational view of the bicycle crank assembly and the bicycle derailleur diagrammatically illustrating an upshifting operation.
Figure 11:
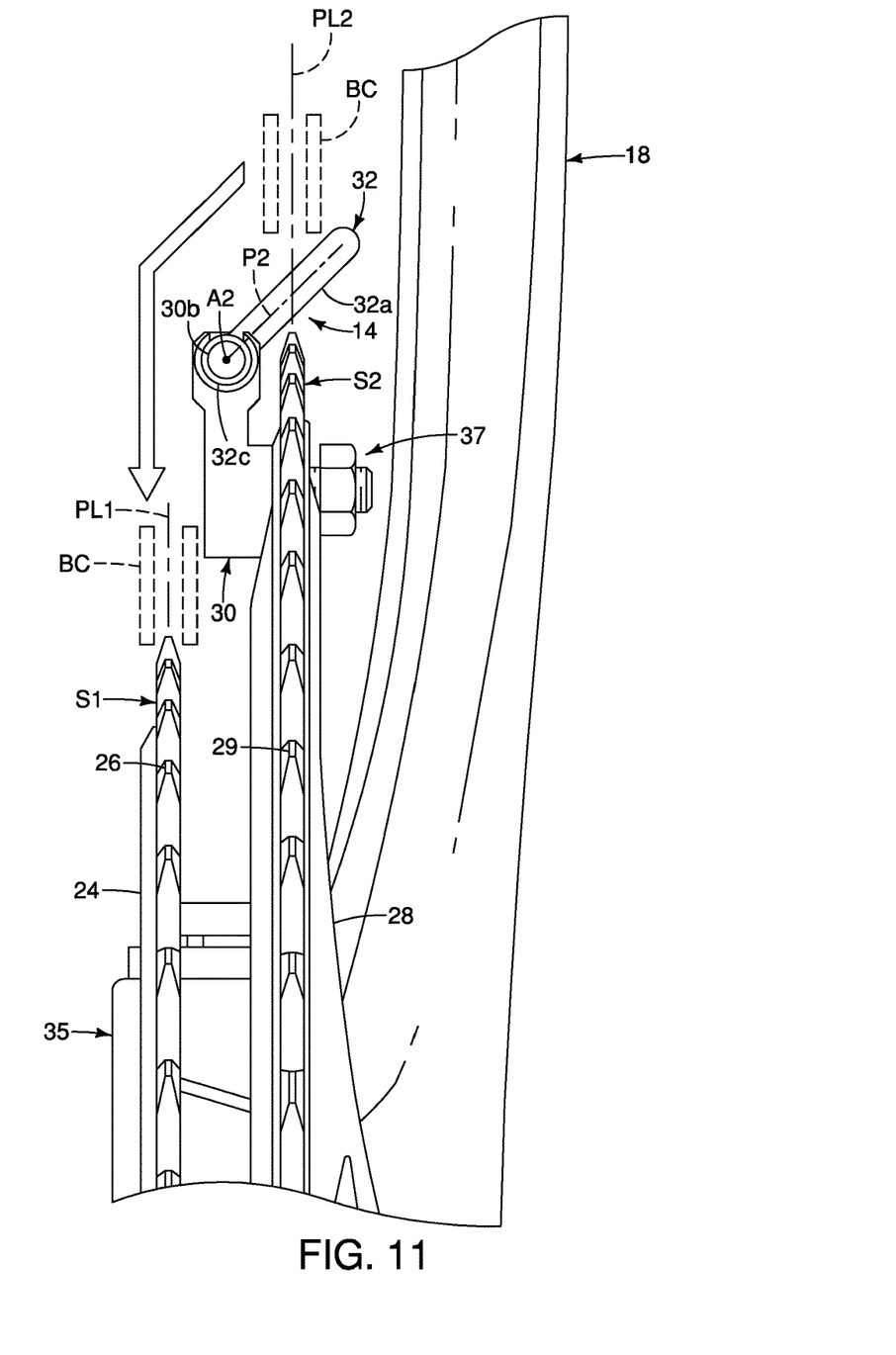
FIG. 11 is a partial rear end elevational view of the bicycle crank assembly and the bicycle derailleur diagrammatically illustrating a downshifting operation.
Figure 12:
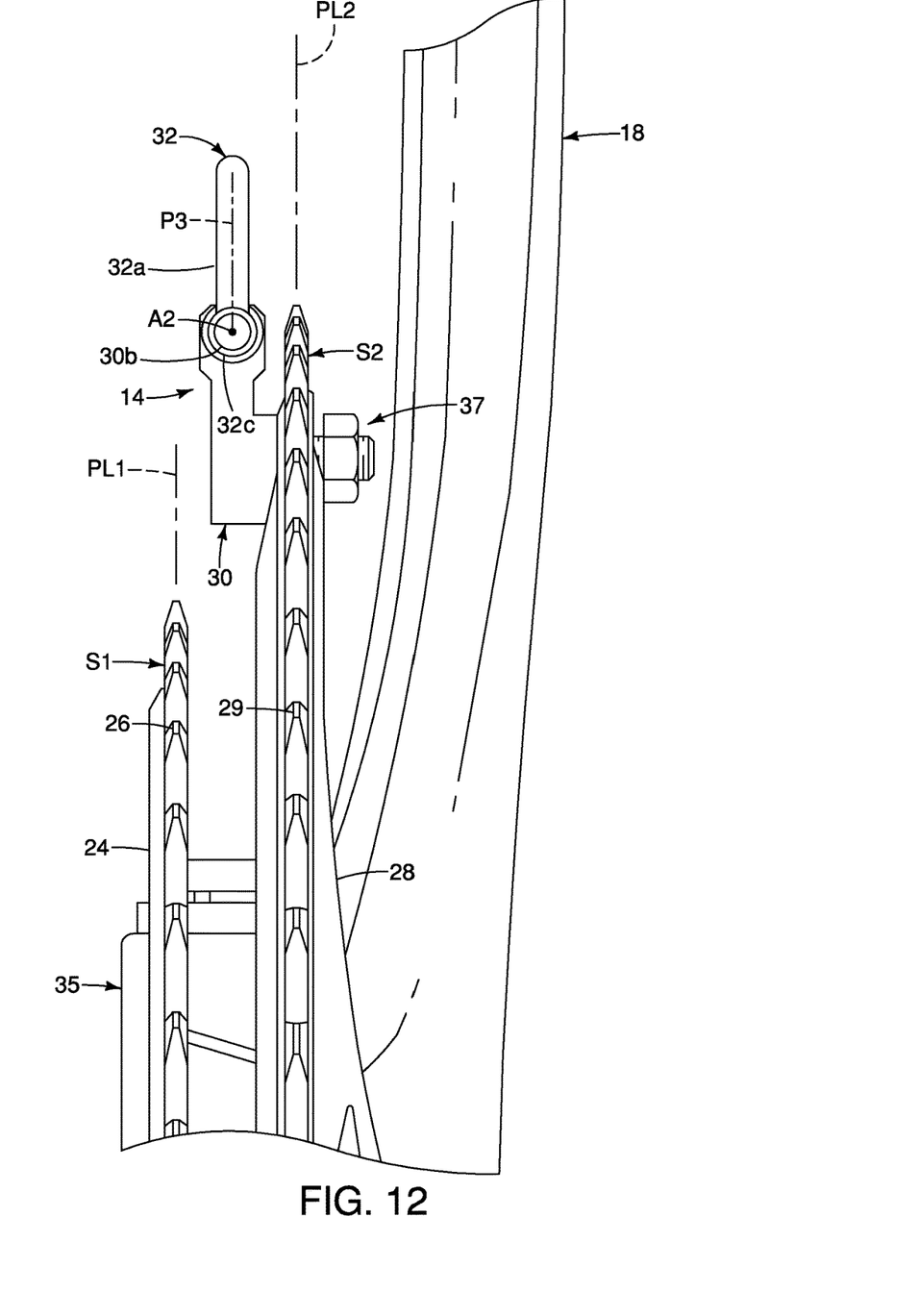
FIG. 12 is a partial rear end elevational view of the bicycle crank assembly and the bicycle derailleur with a movable member of the bicycle derailleur in a third (neutral or non-shifting) position.

In the illustrated embodiment, as seen in FIGS. 10 to 12, the movable member 32 is pivotally arranged about a pivot axis A2 with respect to the base member 30. However, the movement of the movable member 32 is not limited to the pivotal movement. The movable member 32 can be arranged to be slidably movable, for example. More specifically, the movable member 32 is movably arranged between a first position P1 (FIG. 10) and a second position P2 (FIG. 11) in an axial direction that is parallel to the rotational axis A1 in a mounted state where the bicycle derailleur 14 is mounted to the bicycle sprocket apparatus 12. The first position P1 is different from the second position P2. The first position P1 is closer to the first rotational plane PL1 defined by the first sprocket teeth 26 of the first sprocket S1 than the second position P2 with respect to the axial direction in the mounted state. The second position P2 is closer to the second rotational plane PL2 defined by a second sprocket S2 teeth of the second sprocket S2 than the first position P1 with respect to the axial direction in the mounted state. The movable member 32 intersects with the first rotational plane PL1 in the first position P1. The movable member 32 intersects with the second rotational plane PL2 in the second position P2.

In the illustrated embodiment, the first position P1 corresponds to an upshift position to perform an upshifting operation from the first sprocket S1 toward the second sprocket S2. Accordingly, in the illustrated embodiment, the second position P2 corresponds to a downshift position to perform a downshifting operation from the second sprocket S2 toward the first sprocket S1. The first position P1 corresponding to an upshifting operation and a second position P2 corresponding to a downshifting operation. Also, the movable member 32 can be pivoted to a third position P3 (FIG. 12) that is midway between the first and second positions P1 and P2. The first and second positions P1 and P2 are actuated positions in which a shifting operation can be performed. The third position P3 is a non-actuated position in which a shifting operation cannot be performed. However, the third position P3 is not necessary in the illustrated embodiment to save electricity to move the movable member 32 to the third position P3.

In the case of the bicycle crank assembly 16, which only has two sprockets (i.e., the first and second sprockets S1 and S2), the movable member 32 does not need to be moved back to a non-actuated position after a shifting operation is performed. For example, in the first position P1, the bicycle chain BC is lifted by the movable member 32 that is positioned in the first position P1 and shifted toward the second sprocket S2 without subsequent movement of the movable member 32 toward the non-actuated position or other positions. On the other hand, in the second position P2, the bicycle chain BC is lifted by the movable member 32 that is positioned in the second position P2 and shifted toward the first sprocket S1 without subsequent movement of the movable member 32 toward the non-actuated position or other positions. Once the bicycle chain BC has been lifted by the movable member 32 and the bicycle chain BC from one of the first and second sprockets S1 and S2 to the other one of first and second sprockets S1 and S2, the movable member 32 can remain that actuated position. In other words, it is not necessary for the movable member 32 to move back to the non-actuated position at least for shifting between a double sprocket assembly. However, in the case of a triple sprocket assembly having three sprockets, it might be necessary to move the movable member 32 back to a non-actuated position.

Figure 7:
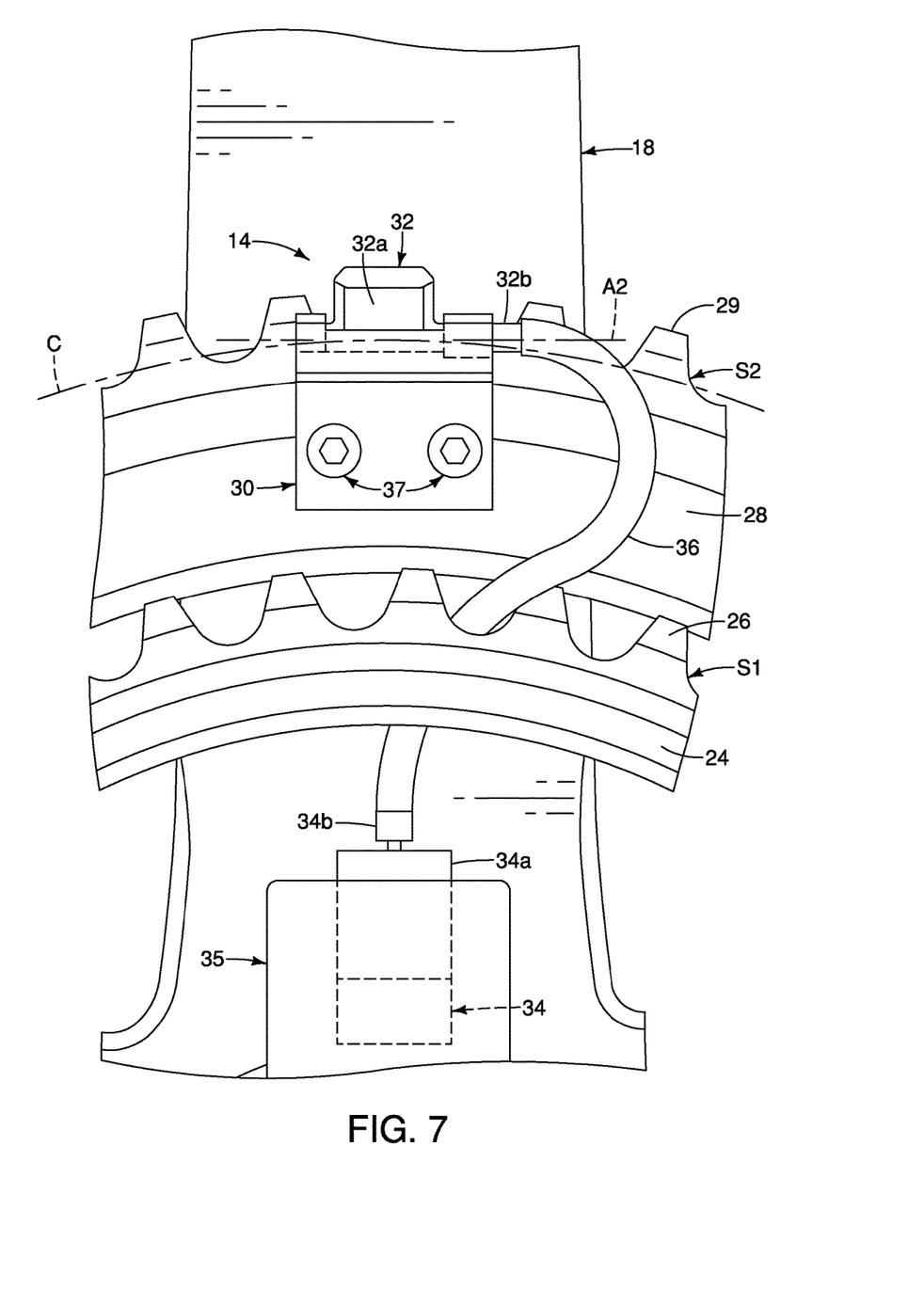
FIG. 7 is a partial inside elevational view of a portion of the bicycle crank assembly with the bicycle derailleur attached thereto.
Figure 8:
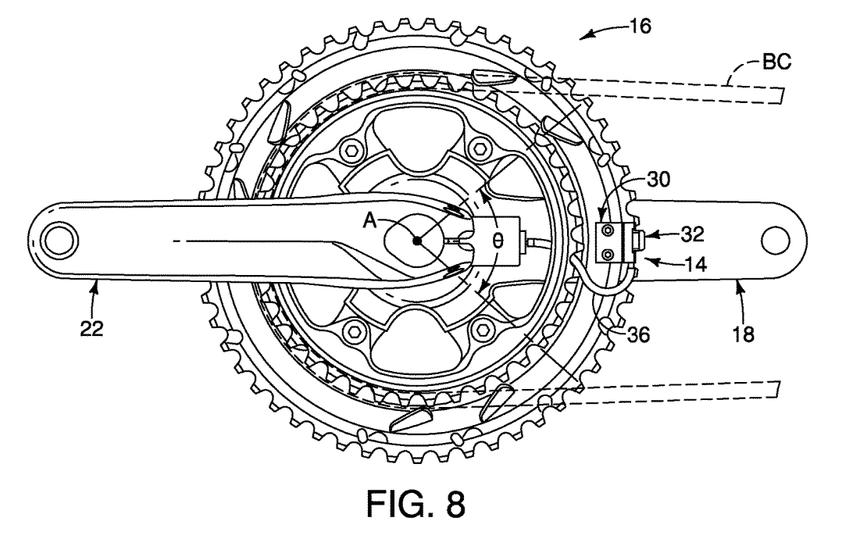
FIG. 8 is a left side elevational view of the bicycle crank assembly and the bicycle derailleur attached thereto with a bicycle chain engaged with a small sprocket of the bicycle derailleur disposed in a first (upshifting) position.
Figure 9:
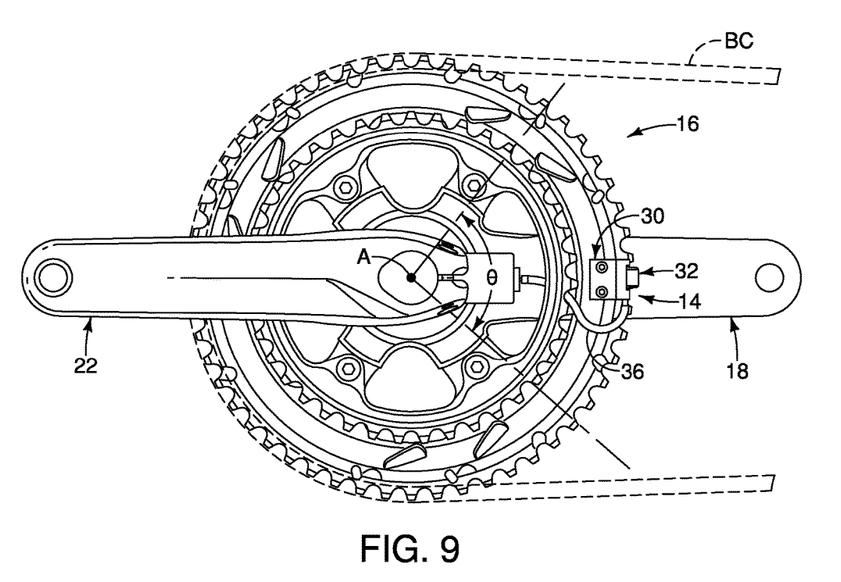
FIG. 9 is a left side elevational view of the bicycle crank assembly and the bicycle derailleur attached thereto with a bicycle chain engaged with a large sprocket of the bicycle derailleur disposed in a second (downshifting) position.

As seen in FIG. 4, the pivot axis A2 is perpendicular to the rotational axis A1. As seen in FIG. 7, the pivot axis 42 extends in a tangential direction with respect to a circle C that is centered on the rotational axis A1 in a mounted state where the bicycle derailleur 14 is mounted to the bicycle sprocket apparatus 12.

In the illustrated embodiment, the electric actuator 34 includes an electric motor 34a having an output axle 34b. The electric motor 34a is a reversible electric motor so that the output axle 34b can be selectively rotated in each of rotational direction. The electric actuator 34 also includes a motor driver (not shown) for driving the electric motor 34a.

Figure 5:
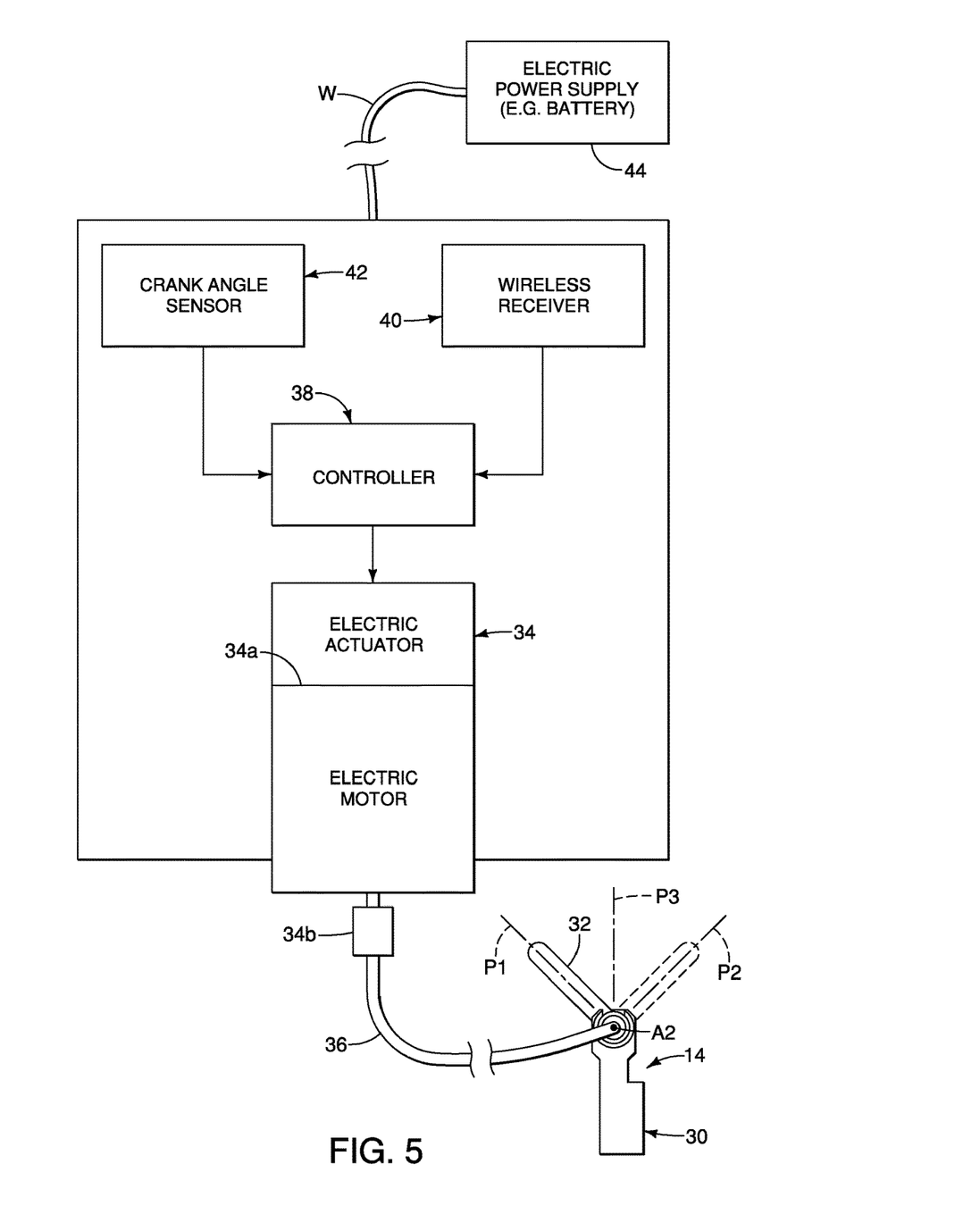
FIG. 5 is a block diagram of the bicycle derailleur in accordance with the illustrated embodiment illustrated in FIGS. 2 to 4.

The bicycle derailleur 14 further comprises a controller 38 configured to control the electric actuator 34 to selectively move the movable member 32 toward one of the first position P1 and the second position P2 in accordance with an input signal. Here, the input signal is wirelessly sent from the road brifter B that is associated with the bicycle derailleur 14. In the illustrated embodiment, the bicycle derailleur 14 further comprises a wireless receiver 40 to receive the input signal for the controller 38 to control movement of the movable member 32. As diagrammatically illustrated in FIG. 5, the controller 38 and the wireless receiver 40 are both disposed in the housing 35 that also houses the electric actuator 34. In this way, the electric actuator 34 is positioned radially inward of the movable member 32 with respect to the rotational axis A1 in a mounted state where the bicycle derailleur 14 mounted to the bicycle sprocket apparatus 12. However, the electric actuator 34 does not need to be disposed on the first crank arm 18. Rather, the electric actuator 34 can be disposed on one of the first crank arm 18, the second crank arm 22 and the crank axle 20. In the illustrated arrangement, the electric actuator 34 is disposed on the first crank arm 18 so that the movable member 32 can be easily actuated by the transmitting member 36.

In the illustrated embodiment, the controller 38 is an electronic controller such as a microcomputer that includes a central processing unit (CPU) or processor. The controller 38 can includes other conventional components such as an input interface circuit, an output interface circuit, and storage devices such as ROM (Read Only Memory) device and RAM (Random Access Memory) device. Basically, the controller 38 is programmed to operate the bicycle derailleur 14 to move the bicycle chain BC between the first and second sprockets S1 and S2 in response to operation of the road brifter B that is associated with the bicycle derailleur 14. In other words, the electric motor 34a rotates the output axle 34b which in turn rotates the transmitting member 36 to move the movable member 32 between the first position P1 and the second position P2. In the illustrated embodiment, the transmitting member 36 comprises only a flexible tubular member to transmit a rotational force of output axle 34b of the electric motor 34 to the movable member 32. Once the controller 38 has moved the movable member 32 to one of the first position P1 and the second position P2, the controller 38 is configured to control the electric actuator 34 to maintain the movable member 32 in the one of the first position P1 and the second position P2. More specifically, the controller 38 is configured to maintain the movable member 32 in the one of the first position P1 and the second position P2 until the controller 38 receives the input signal to move the movable member 32 toward the other of the first position P1 and the second position P2. Of course, optionally or in the case of a triple sprocket assembly, the controller 38 can either automatically move the movable member 32 from either the first position P1 or the second position P2 to the third position P3 after a shifting operation is completed.

Preferably, the controller 38 is configured to control the electric actuator 34 to move the movable member 32 toward the one of the first position P1 and the second position P2 only within a predetermined rotational angle $\theta$ of the bicycle sprocket apparatus 12 about the rotational axis A1. In the illustrated embodiment, the bicycle derailleur 14 further comprises a crank angle sensor 42 to detect the position of the first crank arm 18 with respect to the bicycle frame F. Specifically, the crank angle sensor 42 detects the magnets M. The magnets M are angular spaced apart by the predetermined rotational angle $\theta$. In this way, when the crank angle sensor 42 detects a first one of the magnets M, the crank angle sensor 42 inputs a signal to the controller 38 indicating the the movable member 32 entering a shifting area defined by the predetermined rotational angle $\theta$ to allow for the movement of the movable member 32. When the crank angle sensor 42 detects a second one of the magnets M, the crank angle sensor 42 inputs a signal to the controller 38 indicating the movable member 32 exiting the shifting area defined by the predetermined rotational angle $\theta$ to prevent the movement of the movable member 32.

Referring back to FIGS. 3 to 5, the bicycle derailleur 14 further comprises a power supply 44 to supply electricity to the electric actuator 34. The power supply 44 also provides power to the controller 38. In the illustrated embodiment, the power supply 44 is configured to be disposed into the crank axle 20. Alternatively, the power supply 44 can be disposed on one of the first and second crank arms 18 and 22. Here, the power supply 44 is electrically connected to the electric actuator 34 and the controller 38. The power supply 44 is a rechargeable battery, for example. The power supply 44 is detachably connected to the electric actuator. However, the power supply 44 can be integrally and non-detachably connected to the electric actuator. In such an example, the bicycle derailleur 14 can includes a charging port to charge an electricity of the power supply 44.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle derailleur. Accordingly, these directional terms, as utilized to describe the bicycle derailleur should be interpreted relative to a bicycle in an upright riding position on a horizontal surface and that is equipped with the bicycle derailleur. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle derailleur comprising:
a base member configured to rotate together with a bicycle sprocket apparatus about a rotational axis of the bicycle sprocket apparatus, the base member being configured to be mounted a sprocket body of the bicycle sprocket apparatus;
a movable member movable relative to the base member to displace a bicycle chain; and
an electric actuator configured to electrically actuate the movable member.

2. The bicycle derailleur according to claim 1, wherein the movable member protrudes from the base member in a radially outward direction with respect to the rotational axis in a mounted state where the bicycle derailleur is mounted to the bicycle sprocket apparatus.

3. The bicycle derailleur according to claim 2, wherein the movable member is configured to be disposed radially outward from sprocket teeth of the bicycle sprocket apparatus in the mounted state.

4. The bicycle derailleur according; to claim 1, wherein the movable member is pivotally arranged about a pivot axis with respect to the base member.

5. The bicycle derailleur according to claim 4, wherein the pivot axis is perpendicular to the rotational axis.

6. The bicycle derailleur according to claim 5, wherein the pivot axis extends in a tangential direction with respect to a circle centered on the rotational axis in a mounted state where the bicycle derailleur is mounted to the bicycle sprocket apparatus.

7. The bicycle derailleur according to claim 1, wherein the movable member is movably arranged between a first position and a second position in an axial direction that is parallel to the rotational axis in a mounted state where the bicycle derailleur is mounted to the bicycle sprocket apparatus, the first position being different from the second position.

8. The bicycle derailleur according to claim 7, wherein the first position corresponding to an upshifting operation and a second position corresponding to a downshifting operation.

9. The bicycle derailleur according to claim 7, further comprising
a controller configured to control the electric actuator to selectively move the movable member toward one of the first position and the second position in accordance with an input signal.

10. The bicycle derailleur according to claim 9, wherein the controller is configured to control the electric actuator to move the movable member toward the one of the first position and the second position only within a predetermined rotational angle of the bicycle sprocket apparatus about the rotational axis.

11. The bicycle derailleur according to claim 9, wherein the controller is configured to control the electric actuator to maintain the movable member in the one of the first position and the second position.

12. The bicycle derailleur according to claim 9, wherein the controller is configured to maintain the movable member in the one of the first position and the second position until the controller receives the input signal to move the movable member toward the other of the first position and the second position.

13. The bicycle derailleur according to claim 9, further comprising
a wireless receiver to receive the input signal for the controller to control movement of the movable member.

14. The bicycle derailleur according to claim 7, wherein the bicycle sprocket apparatus includes a first sprocket including a first sprocket body and a plurality of first sprocket teeth extending radially outward from the first sprocket body, and a second sprocket having a second sprocket body and a plurality of second sprocket teeth extending radially outward from the second sprocket body, a diameter of the second sprocket body being larger than a diameter of the first sprocket body, and
the first position is closer to a first rotational plane defined by the first sprocket teeth of the first sprocket than the second position with respect to the axial direction in the mounted state.

15. The bicycle derailleur according to claim 14, wherein the movable member intersects with the first rotational plane in the first position.

16. The bicycle derailleur according to claim 14, wherein the second position is closer to a second rotational plane defined by a second sprocket teeth of a second sprocket than the first position with respect to the axial direction in the mounted state.

17. The bicycle derailleur according to claim 16, wherein the movable member intersects with the second rotational plane in the second position.

18. The bicycle derailleur according to claim 1, wherein the electric actuator is positioned radially inward of the movable member with respect to the rotational axis in a mounted state where the bicycle derailleur mounted to the bicycle sprocket apparatus.

19. The bicycle derailleur according to claim 18, wherein the bicycle sprocket apparatus includes a bicycle crank assembly including a first sprocket, a second sprocket, a crank arm and a crank axle, and
the electric actuator is disposed on one of the crank arm and the crank axle.

20. The bicycle derailleur according to claim 1, further comprising
a transmitting member to transmit a driving force from the electric actuator to the movable member.

21. The bicycle derailleur according to claim 20, wherein the transmitting member includes a flexible member.

22. The bicycle derailleur according to claim 1, further comprising
a power supply to supply electricity to the electric actuator.

23. The bicycle derailleur according to claim 22, wherein the bicycle sprocket apparatus includes a bicycle crank assembly including a first sprocket, a second sprocket, a crank arm and a crank axle,
the power supply is configured to be disposed into the crank axle.

* * * * *